(12) United States Patent
Berhane et al.

(10) Patent No.: US 6,532,096 B2
(45) Date of Patent: Mar. 11, 2003

(54) SYSTEM AND METHOD FOR CANCELING RINGING IN A MEMS DEVICE

(75) Inventors: Bereket Berhane, Stone Mountain, GA (US); Dan Guthrie, Duluth, GA (US); David Walker, Marietta, GA (US)

(73) Assignee: Bandwidth 9, Inc., Fremont, CA (US)

( * ) Notice: Subject to any disclaimer, the term of this patent is extended or adjusted under 35 U.S.C. 154(b) by 0 days.

(21) Appl. No.: 09/851,401

(22) Filed: May 7, 2001

(65) Prior Publication Data

US 2002/0171902 A1 Nov. 21, 2002

(51) Int. Cl.[7] .......................... G02B 26/02; G02B 26/08
(52) U.S. Cl. ...................... 359/230; 359/223; 359/224; 372/20; 385/16; 385/18
(58) Field of Search ................................. 359/196–199, 359/212–214, 220–224, 227, 230; 385/16–23; 372/20, 24, 15

(56) References Cited

U.S. PATENT DOCUMENTS

| 3,010,035 A | | 11/1961 | Calvert et al. ............... 307/152 |
| 4,948,223 A | * | 8/1990 | Anderson et al. |
| 5,052,777 A | * | 10/1991 | Ninis et al. .................... 385/19 |
| 5,610,848 A | | 3/1997 | Fowell .................. 364/724.07 |

* cited by examiner

Primary Examiner—James Phan
(74) Attorney, Agent, or Firm—Heller Ehrman White & McAuliffe; Paul Davis

(57) ABSTRACT

A Finite Impulse Response (FIR) filter for suppressing ringing in tunable, or adjustable, members of MEMS devices is described. In embodiments of the invention, the FIR filter includes staggered proportional plus delay filters, or posicast filters. The FIR filter of the present invention is applicable to an adjustable mechanical member in a MEMS device which can be modeled as single mode second order system characterized by a resonance frequency $\omega_0$ and damping constant $\zeta \ll 1$, i.e., a highly underdamped, single mode, second order system.

22 Claims, 2 Drawing Sheets

SEMI-CONDUCTOR

_US 6,532,096 B2_

SYSTEM AND METHOD FOR CANCELING RINGING IN A MEMS DEVICE

BACKGROUND OF THE INVENTION

1. Field of the Invention

This invention relates to the field of micro-electromechanical systems (MEMS). In particular, the invention relates to a system and method for canceling ringing in tunable members of MEMS devices.

2. Description of the Related Art

The field of Micro-electromechanical systems (MEMS) are devices containing miniature mechanical parts, often contained within a silicon substrate. These tiny mechanical may include members such as gears, mirrors, sensors, or valves embedded in semiconductor chips. Such devices may be fabricated in large quantities, exploiting techniques developed for the manufacture of silicon wafers. Domains in which the technology may be applied include optoelectronics, microfluidics, and control systems.

A substrate including a MEMS device may also incorporate electronic circuitry which may be used to control the MEMS device. Although the prior art includes similar control systems applied to other mechanical technologies, these techniques have proven inadequate of MEMS technology. As such, there is a need for including control circuitry in a MEMS device for canceling ringing in adjustable mechanical members contained in the MEMS device.

SUMMARY OF THE INVENTION

The invention includes a Finite Impulse Response (FIR) filter for suppressing ringing in tunable, or adjustable, members of MEMS devices. In embodiments of the invention, the FIR filter includes staggered proportional plus delay filters, or posicast filters. The FIR filter of the present invention is applicable to an adjustable mechanical member in a MEMS device which can be modeled as single mode second order system characterized by a resonance frequency $\omega_0$ and damping constant $\zeta \ll 1$, i.e., a highly underdamped, single mode, second order system.

In embodiments of the invention, the MEMS device may be an optical micro-electromechanical switch. In some embodiments, this may be a tunable laser, such as an edge emitting tunable laser, or a vertical cavity surface emitting tunable laser, or VCSEL. In embodiments of the invention, the adjustable mechanical member in the MEMS device may be a cantilever arm, used to adjust a length of a Fabry-Perot microcavity in the tunable laser. In other embodiments, the adjustable mechanical member may comprise a mirror.

The invention includes a method of suppressing ringing in the mechanical component of an optical micro electromechanical switch, wherein the mechanical component has a positive damping constant substantially less than unity. The method may comprise one or more of the following steps: applying a first part of an electrical signal to the mechanical component; after a delay of about one half of an oscillation period of the mechanical component, applying a second part of the electrical signal to the mechanical component to cancel the ringing in the mechanical component. In some embodiments, the oscillation period of the mechanical component is equal to a multiple of an inverse of a damped resonance frequency of the cantilever arm and a constant pi. In alternative embodiments, the second part of the electrical signal is applied after a delay of on or about eight microseconds. These and other embodiments shall be elaborated infra.

DETAILED DESCRIPTION

A. System Overview

Micro electromechanical systems (MEMS) typically include moving components. For instance, a tunable semiconductor laser system with a movable cantilever arm is described in U.S. Pat. No. 6,181,717, entitled "Tunable Semiconductor Laser System," inventors Peter Kner, Gabriel Li, D. Philip Worland, Rang-Chen Yu, Wupen Yuen, which is hereby incorporated by reference in its entirety.

Figure 1:
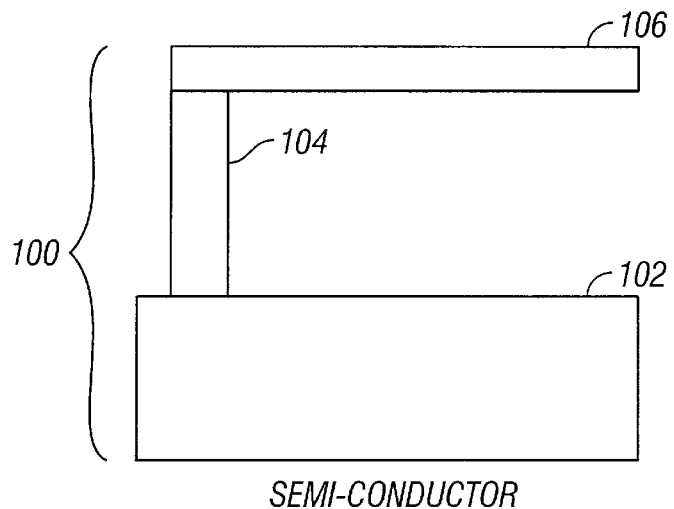
FIG. 1 illustrates a cantilever apparatus in a tunable semiconductor laser.

FIG. 1 illustrates one such tunable vertical cavity surface emitting laser (VCSEL) 100 which is etched on a substrate 102 and includes a cantilever apparatus 104 with a cantilever arm 106. The cantilever apparatus 104 employs an electrostatic force which pulls on the cantilever arm 106. The mechanical deflection resulting from this electrostatic force is used to change the length of a Fabry-Perot microcavity in the laser and, consequently, the resonance wavelength of the tunable laser.

In many MEMS systems, movable components can be modeled as single mode second order system characterized by a resonance frequency $\omega_0$ and damping constant $\zeta$. One such example is the cantilever arm 106 of the tunable laser 100. Another parameter that characterizes such components is their damped resonance frequency $\omega_d = \omega_0(1-\zeta^2)^{1/2}$. If $\zeta \ll 1$, the system oscillates many times in response to a step input or any input with an abrupt stop. In embodiments of the invention, the cantilever arm is a highly under damped ($\zeta \approx 0.05$) system. Thus when tuning the cantilever, if a fast rising ramp voltage is applied and held at the desired target channel, the arm will oscillate for several cycles before settling ($\approx 250\ \mu s$). A long settling time is, of course, undesirable. Furthermore, in applications where channels are to be counted while tuning, ringing can cause miscount of channels.

The invention includes a Finite Impulse Response (FIR) filter for suppressing ringing in the tunable member of the MEMS device. In embodiments of the invention, the FIR filter includes staggered proportional plus delay filters, or posicast filters. A discussion of posicast filters is presented below, followed by an explication of the FIR filter used in the invention. For illustrative purposes, the FIR will be described in the context of the cantilever in the tunable laser. However, it will be apparent to one skilled in the art that the technique is extensible to any adjustable mechanical member in a MEMS device which can be modeled as single mode second order system characterized by a resonance frequency $\omega_0$ and damping constant $\zeta \ll 1$, i.e., a highly underdamped, single mode, second order system.

B. Posicast Filters

One method of eliminating ringing in the tunable member is by applying a part of the input command immediately and delaying the other part in such away the unwanted vibrations that result from the two cancel each other. This process is equivalent to passing the command through a proportional plus delay filter, or posicast filter. Posicast filters are described by J. F. Calvert and D. J. Gimble in Signal Component Control, Trans AIEE, pt.2, Applications and Industry, vol. 71, pp. 339–343 November, 1952, which is hereby incorporated by reference. Calvert et al. studied this in a more general framework in 1950's; this work was also the subject of U.S. Pat. Nos. 2,801,351 and 3,010,035. The method of Calvert et al. involves mathematically imposing a constraint that there be no ringing in the output, and subsequently solving for the filter gains and delays.

An application of such techniques to a single mode second order system is elaborated in "Feedback Control Systems," McGraw-Hill Book Company Inc., N.Y., 1958. Smith teaches how to move a vertically suspended payload in half-cycle time from a given initial position to a final stationary position. Smith refers to this method as a "positive-cast" or in short posicast control. As taught in the reference above, the control mechanism should have the transfer function $$posicast = \frac{1}{1+k} + \frac{k}{1+k}e^{-sT_d}.$$

Here, the delay time $T_d$ equals $\pi/\omega_d$ (half cycle) and $$k = \exp\left\{\frac{-\pi\varsigma}{\sqrt{1-\varsigma^2}}\right\}$$

In discrete systems the posicast control can be implemented using the FIR filter given by $$posicast = \frac{1}{1+k} + \frac{k}{1+k}z^{-n}$$

where n=[$T_d$/(sampling time)].

Figure 2:
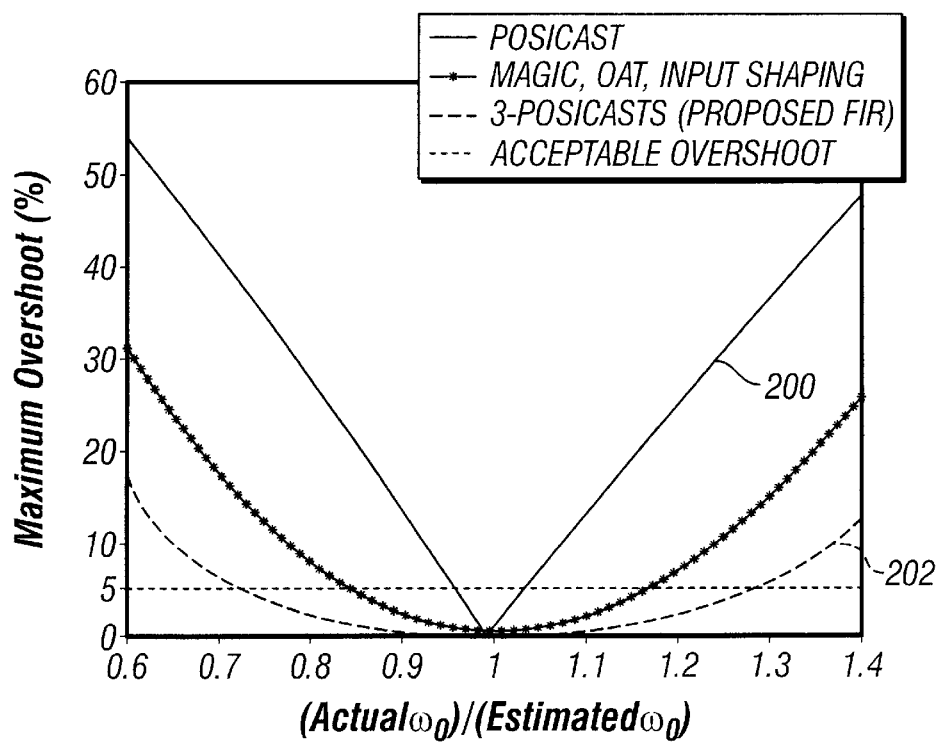
FIG. 2 illustrates the sensitivity of various types of filters to changes in resonance frequency.

As illustrated in FIG. 2, the posicast filter 200 eliminates any overshoot, if both $\omega_0$ and $\zeta$ are precisely known. Otherwise its effectiveness is diminished. Because of this problem with robustness posicast control methods remained dormant until mid 1980's when Cook recommended them for controlling elastic structures, in which the necessary parameters of which can be known with good precision. This work is elaborated in Cook, "control of Flexible Structures via Posicast", Proceedings of the Eighteenth Southeastern Symposium on System Theory, April, 1986, pp. 31–35. Since this work, several techniques to improve robustness have been suggested.

One such technique is elaborated in U.S. Pat. No. 4,916,635 issued 1990, inventors Singer and Seering. U.S. Pat. No. 4,916,635 discloses an algorithm called input shaping that increases the robustness to variations in the natural frequency. The scheme is similar to Calvert's. However, instead of one time delay, the input shaping technique allows for multiple time delays. The technique also involves the placement of additional constraints and subsequent solution for the filter gains and time delays. The first additional constraint is that the derivative of the output in response to changes in the resonance frequency be zero. The second constraint is that the second derivative is zero, etc. Although not explicitly stated in their claims, applying the algorithm of Singer et al requires the time delays to be multiples of $\pi/\omega_d$.

C. Application of Multiple posicast Filters a) Fixed Time Delay

Another way to increase the robustness to change in the resonance frequency is by repeatedly using the posicast filter. In fact it has been shown that the Singer and Seering algorithm is equivalent to repeated application of the posicast filter; this has been demonstrated in D. P. Magee and W. J. Book, "Filtering Schilling Manipulator Commands to Prevent Flexible Structure Vibration," Proceedings of the American Control Conference, vol. 3, pp. 2538–2542, 1994, in which the number of filters used corresponds to the number of constraints.

Different Time Delays

Further increase in robustness can be achieved by using posicast filters with slightly varying time delays. R. A. Fowell, U.S. Pat. No. 5,610,848, issued 1997, inventor R. A. Fowell, discloses the application of staggered posicast filters for a satellite control system.

Optimal Arbitrary Time (OAT) Filter

The OAT filter, disclosed in U.S. Pat. No. 6,078,884 (2000), inventors D. P. Magee and W. J. Book, allows for arbitrary time delays, i.e., the time delays do not have to be a multiple of $\pi/\omega_d$. The filter coefficients are computed by minimizing a specific cost function. The transfer function is given by $$\left.\begin{array}{c}OAT\\Magic\end{array}\right\} = \frac{1 + 2\cos(\omega_d T_d)k_M e^{-sT_d} + k_M^2 e^{-sT_d}}{1 + 2\cos(\omega_d T_d)k_M + k_M^2} \text{ where}$$

$$k_M = \exp\left\{-\frac{\varsigma\omega_d T_d}{\sqrt{1-\varsigma^2}}\right\}$$

where

This transfer function is also found (identically and in the same context) in Smith's textbook. To distinguish between the two the filter given by Smith will be referred to hereafter as magic filter.

D. Finite Input Response (FIR) Filter

Embodiments of the invention include a Finite Input Response (FIR) filter. In embodiments, the filter includes three staggered posicast filters with different time delays. The transfer function is given by $$H = \left(\frac{1}{1+k} + \frac{k}{1+k}e^{-s(T_d-\tau)}\right)\left(\frac{1}{1+k} + \frac{k}{1+k}e^{-sT_d}\right)\left(\frac{1}{1+k} + \frac{k}{1+k}e^{-s(T_d+\tau)}\right).$$

Figure 3:
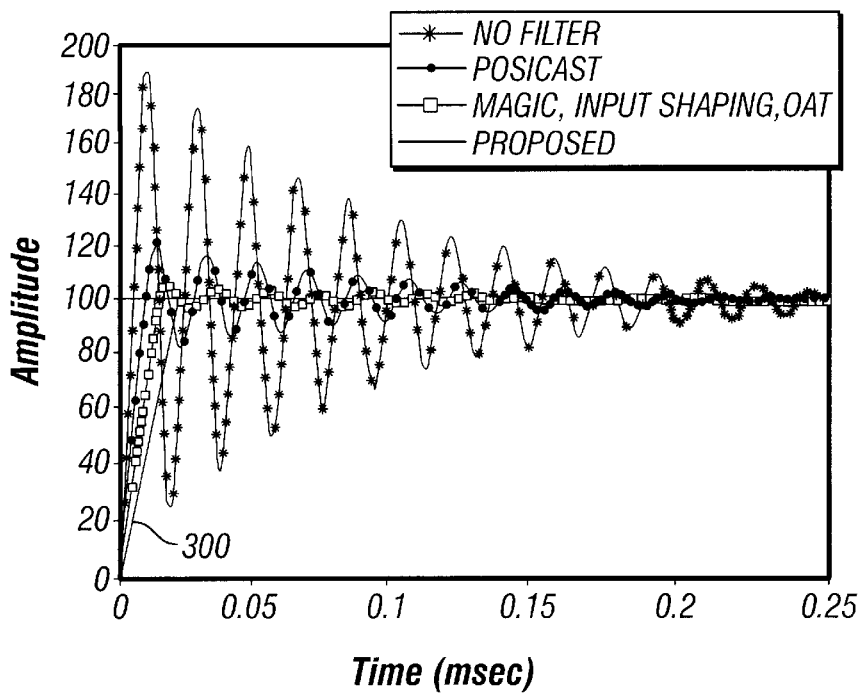
FIG. 3. illustrates a step response to filtered input by various types of filters when the estimated resonance frequency deviates from the actual frequency by 15%.
Figure 4:
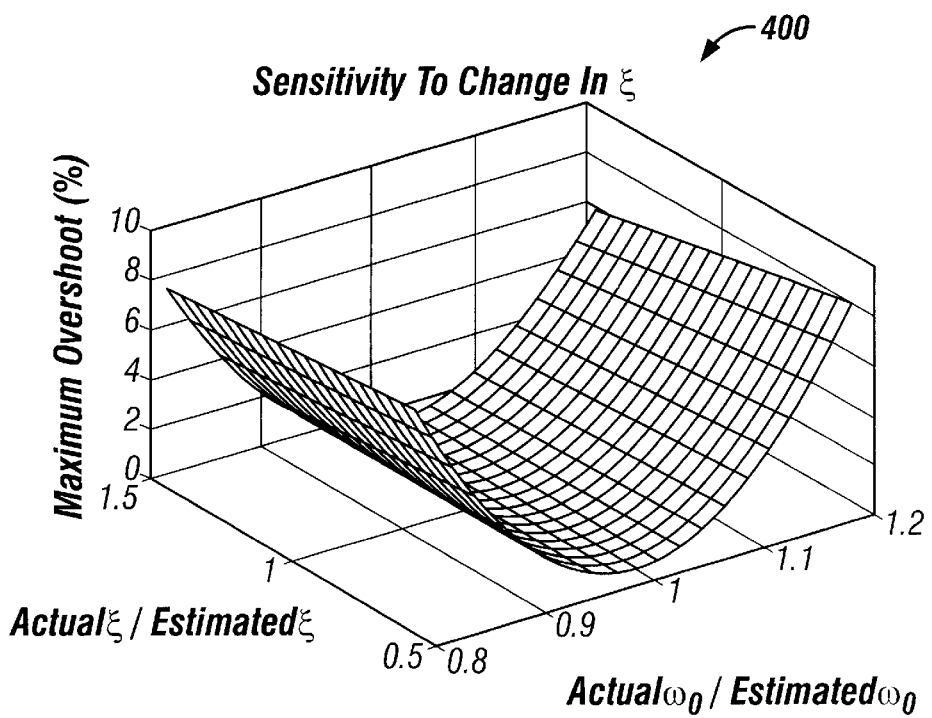
FIG. 4 illustrates the sensitivity of an FIR in the present invention to changes in the damping constant.

In some embodiments, such as the examples that follow, $T_d$=estimated half-cycle ($\pi/\omega_d$) and $\tau$=0.1 $T_d$; these parameters may be adjusted as needed. If a=1/(1+k) and b=k/(1+k) the FIR filter that implements this can be written as $$H(z) = a^3 + a^2 bz^{-(N+n)} + a^2 bz^{-N} + a^2 bz^{-(N-n)} + ab^2 z^{-(2N+n)} + ab^2 z^{-2N} + ab^2 z^{-(2N-n)} + b^3 z^{-3N}$$

where N=[$T_d$/(sampling time)], and n=[$\tau$/(sampling time)]. FIG. 2 shows a comparison of the performance of the various filters discussed thus far. Clearly, the FIR filter of the present invention 202 is the most robust to changes in the resonance frequency. FIG. 3 is a step response of a second order system when the estimated natural frequency is off by 15% from the actual frequency. Again the FIR filter of the present invention demonstrates the best result 300. FIG. 4 shows the sensitivity of the performance of the FIR filter of the present invention to changes in the damping constant 400. Since the system under consideration is highly under damped, the filter is robust to changes in the damping constant.

E. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A method of suppressing ringing in a mechanical component of an optical micro electro-mechanical switch, wherein the mechanical component has a positive damping constant substantially less than unity, the method comprising:

applying a first part of an electrical signal to the mechanical component;

after a delay of about one half of an oscillation period of the mechanical component, applying a second part of the electrical signal to the mechanical component to cancel the ringing in the mechanical component.

2. The method of claim 1, wherein the oscillation period of the mechanical component is equal to a multiple of an inverse of a damped resonance frequency of a cantilever arm of the mechanical component, and a constant pi.

3. The method of claim 2, wherein the mechanical component comprises a cantilever arm in the optical switch.

4. The method of claim 2, wherein the mechanical component comprises a mirror in the optical switch.

5. The method of claim 1, wherein the optical micro electo-mechanical switch comprises a tunable laser.

6. The method of claim 5, wherein the tunable laser is an edge emitting laser.

7. The method of claim 5, wherein the tunable laser is a vertical cavity surface emitting laser (VCSEL).

8. The method of claim 7, wherein the mechanical component is a cantilever arm in the VCSEL, such that a position of the cantilever arm determines a length of a Fabry-Perot microcavity in the VCSEL.

9. A method of suppressing ringing in a mechanical component of an optical micro electro-mechanical switch, wherein the mechanical component has a positive damping constant substantially less than unity, the method comprising:

applying a first part of an electrical signal to the mechanical component;

after a delay of about eight microseconds, applying a second part of the electrical signal to the mechanical component to cancel the ringing in the mechanical component.

10. The method of claim 9, wherein the oscillation period for the mechanical component is equal to a multiple of an inverse of a damped resonance frequency of a cantilever arm of the mechanical component, and a constant pi.

11. The method of claim 10, wherein the mechanical component comprises a cantilever arm in the optical switch.

12. The method of claim 11, wherein the optical micro electo-mechanical switch comprises a tunable laser.

13. The method of claim 12, wherein the tunable laser is an edge emitting laser.

14. The method of claim 12, wherein the tunable laser is a vertical cavity surface emitting laser (VCSEL).

15. The method of claim 14, wherein the mechanical component is a cantilever arm in the VCSEL, such that a position of the cantilever arm determines a length of a Fabry-Perot microcavity in the VCSEL.

16. The method of claim 10, wherein the mechanical component comprises a mirror in the optical switch.

17. An optical MEMS switch including:

a cantilever arm, the cantilever arm comprising a single mode second order system with a constant resonance frequency, a damping constant, and a damped resonance frequency, the damped resonance frequency being a positive number substantially less than unity;

a finite input response filter for damping ringing in the cantilever arm, the finite input response filter further including two or more cascaded positive-cast filters, the two or more positive-cast filters having different time delays.

18. The optical MEMS switch of claim 17, wherein the two or more positive-cast filters include three or more filters.

19. The optical MEMS switch of claim 17, wherein the optical MEMS switch comprises a tunable laser.

20. The optical MEMS switch of claim 19, wherein the optical MEMS switch is a edge emitting laser.

21. The optical MEMS switch of claim 19, wherein the optical MEMS switch is a vertical cavity surface emitting laser (VCSEL).

22. The optical MEMS switch of claim 21, further comprising:

a Fabry-Perot microcavity, wherein the cantilever arm is coupled to the Fabry-Perot microcavity, such that an adjustable position of the cantilever arm determines a length of the Fabry-Perot of the microcavity.

* * * * *